|||||||||||||||||||||||||||||||||||||||||||||||||||
US010575036B2

(12) United States Patent
Zhu et al.

(10) Patent No.: US 10,575,036 B2
(45) Date of Patent: Feb. 25, 2020

(54) PROVIDING AN INDICATION OF HIGHLIGHTS IN A VIDEO CONTENT ITEM

(71) Applicant: GOOGLE INC., Mountain View, CA (US)

(72) Inventors: Guoliang Zhu, San Bruno, CA (US); Emmanuel Rene Saint-Loubert-Bie, Redwood City, CA (US)

(73) Assignee: GOOGLE LLC, Mountain View, CA (US)

(*) Notice: Subject to any disclaimer, the term of this patent is extended or adjusted under 35 U.S.C. 154(b) by 156 days.

(21) Appl. No.: 15/058,842

(22) Filed: Mar. 2, 2016

(65) Prior Publication Data

US 2017/0257651 A1 Sep. 7, 2017

(51) Int. Cl.
G06F 3/00 (2006.01)
G06F 13/00 (2006.01)
H04N 5/445 (2011.01)
H04N 7/16 (2011.01)
H04N 7/173 (2011.01)
H04N 21/2387 (2011.01)
H04N 21/24 (2011.01)
H04N 21/472 (2011.01)
H04N 21/478 (2011.01)

(52) U.S. Cl.
CPC ......... *H04N 21/2387* (2013.01); *H04N 21/24* (2013.01); *H04N 21/4781* (2013.01); *H04N 21/47217* (2013.01)

(58) Field of Classification Search
CPC ............... H04N 21/2387; H04N 21/24; H04N 21/47217; H04N 21/4781
See application file for complete search history.

(56) References Cited

U.S. PATENT DOCUMENTS

| 6,856,757 | B2 | 2/2005 | Dagtas |
| 6,973,256 | B1 | 12/2005 | Dagtas |
| 7,983,442 | B2 | 7/2011 | Chiang et al. |
| 8,243,203 | B2 | 8/2012 | Suh |
| 9,077,956 | B1 | 7/2015 | Morgan et al. |

(Continued)

FOREIGN PATENT DOCUMENTS

| CN | 101013444 | 8/2007 |
| CN | 101064825 | 10/2007 |

(Continued)

OTHER PUBLICATIONS

PCT Search Report & Written Opinion, RE: Application #PCT/US2016/069096, dated May 17, 2017. 19 pages.

(Continued)

*Primary Examiner* — Kyu Chae
(74) *Attorney, Agent, or Firm* — Lowenstein Sandler LLP

(57) ABSTRACT

A video content item may be identified and a first indicator of a highlight occurring in the video content may also be identified. In response to identifying the first indicator of the highlight occurring in the video content item, a second indicator associated with the highlight may be identified to determine a duration of the highlight that has occurred in the video content item. Furthermore, the video content item and an identification of a location of the highlight in the video content item may be provided based on the determined duration that is associated with the second indicator.

18 Claims, 11 Drawing Sheets

(56) References Cited

U.S. PATENT DOCUMENTS

| | | |
|---|---|---|
| 2002/0176689 A1 | 11/2002 | Heo et al. |
| 2003/0063798 A1 | 4/2003 | Li et al. |
| 2004/0130567 A1 | 7/2004 | Ekin et al. |
| 2004/0255249 A1 | 12/2004 | Chang et al. |
| 2005/0228849 A1 | 10/2005 | Ihang |
| 2006/0059120 A1 | 3/2006 | Xiong et al. |
| 2009/0060342 A1 | 3/2009 | Chaing |
| 2012/0009348 A1 | 4/2012 | McDowell et al. |
| 2012/0087637 A1* | 4/2012 | Logan ............... H04H 20/28 386/241 |
| 2012/0189273 A1 | 7/2012 | Folgner et al. |
| 2012/0219271 A1* | 8/2012 | Vunic ............... G06K 9/00711 386/278 |
| 2012/0237182 A1* | 9/2012 | Eyer ............... H04N 5/783 386/241 |
| 2013/0004138 A1* | 1/2013 | Kilar ............... H04N 21/4756 386/230 |
| 2013/0145400 A1* | 6/2013 | Chang ............... H04N 21/42203 725/53 |
| 2014/0270699 A1* | 9/2014 | Casey ............... H04N 5/765 386/241 |
| 2015/0089520 A1* | 3/2015 | Lee ............... H04N 21/251 725/14 |
| 2015/0208138 A1 | 7/2015 | Oguchi |
| 2016/0066042 A1* | 3/2016 | Dimov ............... H04N 21/4667 725/34 |
| 2016/0073168 A1* | 3/2016 | Gardes ............... H04N 21/4788 725/32 |
| 2016/0105708 A1* | 4/2016 | Packard ............... H04N 21/23439 725/10 |
| 2016/0165289 A1* | 6/2016 | McClanahan ....... H04N 21/26208 725/14 |

FOREIGN PATENT DOCUMENTS

| | | |
|---|---|---|
| CN | 103810185 | 5/2014 |
| CN | 104994425 | 10/2015 |
| KR | 20150118002 A | 10/2015 |
| WO | 2010057085 A1 | 5/2010 |

OTHER PUBLICATIONS

GB Examination Search Report , RE: Application #GB 1622431.3, dated Jun. 29, 2017. 4 pages.

GB Examination Search Report, RE: Application #GB 1622431.3 5 pages.

\* cited by examiner

PROVIDING AN INDICATION OF HIGHLIGHTS IN A VIDEO CONTENT ITEM

TECHNICAL FIELD

This disclosure relates to the field of video content and, in particular, to providing an indication of highlights in a video content item.

BACKGROUND

A video content item, such as a sports game or other such event, may be of a long duration with various points of interest during the time or progression of the video content item. For example, a video content item corresponding to a sports game may be several hours long with a small number of events that occur during the sports game that may be of a particular interest to viewers. In other words, an interest curve of the sports game may be relatively flat during most of the time of the sports game, but increases or spikes in the interest curve may occur during these particular events during a time that is of more interest to a viewer. Such events may be referred to as highlights.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Implementations of the disclosure may include a method to identify a video content item and to further identify a first indicator of a highlight occurring in the video content item. The method may further identify, in response to identifying the first indicator of the highlight occurring in the video content item, a second indicator that is associated with the highlight to determine a duration of the highlight that has occurred in the video content item. Further, the video content item may be provided with an identification of a location of the highlight in the video content item based on the determined duration associated with the second indicator.

In some embodiments, the first indicator corresponds to a change in a first key portion of the video content item and the second indicator corresponds to another change in a second key portion of the video content item. The identifying of the first indicator of the highlight occurring in the video content item may include determining that the first key portion of the video content item has changed and the identifying of the second indicator associated with the highlight to determine the duration of the highlight in the video content item may include determining a time that the second key portion of the video content item has changed before the first key portion changed to identify a start time of the highlight.

In some embodiments, the first key portion is a first information overlay associated with the video content item and the second key portion is a second information overlay associated with the video content item In some embodiments, the first indicator of the highlight corresponds to a change in a portion of video of the video content item or a change in audio of the video content item and the second indicator corresponds to a change in the other of the portion of the video or the change in the audio of the video content item.

In some embodiments, the first indicator is associated with user comments for the video content item, and the first indicator of the highlight is identified when a rate of the user comments exceeds a threshold rate and when content of the user comments received at the rate that exceeds the threshold rate is smaller than content of other user comments received during a time that does not exceed the threshold rate.

In some embodiments, the providing of the video content item with the identification of the location of the highlight in the video content item includes providing the indication of the location of the highlight in the video content item on a seek bar of the video content item, where the indication of the location of the highlight identifies a start time and end time of the highlight within the video content item.

In some embodiments, the providing of the identification of the location of the highlight in the video content item includes providing a message in conjunction with the video content item to indicate the highlight in the video content item, and the method may further receive a selection of the message and in response to the selection of the message, change a playback of the video content item to play the video content item at a start time of the highlight.

In some embodiments, a non-transitory machine-readable storage medium storing instructions may be executed to cause a processing device to perform operations such as identifying a video content item, identifying a first indicator of a highlight occurring in the video content item, in response to identifying the first indicator of the highlight occurring in the video content item, identifying a second indicator associated with the highlight to determine a duration of the highlight that has occurred in the video content item, and providing the video content item with an identification of a location of the highlight in the video content item based on the determined duration associated with the second indicator.

In some embodiments, a system may include a memory and a processing device coupled to the memory. The processing device may identify a video content item, identify a first indicator of a highlight occurring in the video content item, in response to identifying the first indicator of the highlight occurring in the video content item, identify a second indicator associated with the highlight to determine a duration of the highlight that has occurred in the video content item, and provide the video content item with an identification of a location of the highlight in the video content item based on the determined duration associated with the second indicator.

BRIEF DESCRIPTION OF THE DRAWINGS

The present disclosure is illustrated by way of example, and not by way of limitation, in the figures of the accompanying drawings.

DETAILED DESCRIPTION

Figure 1:
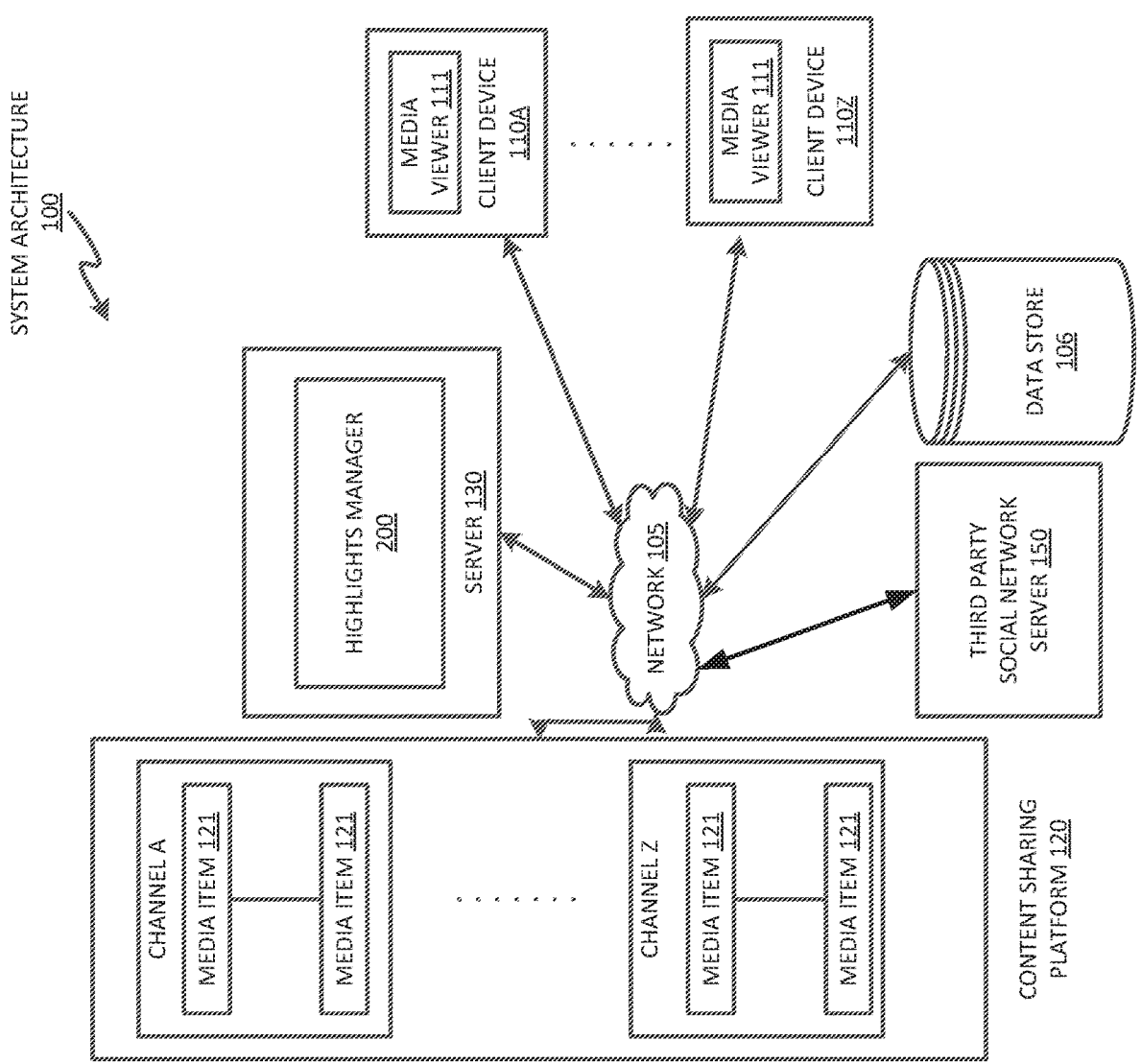
FIG. 1 illustrates an example system architecture in which embodiments of the present disclosure may operate.

Aspects of the present disclosure relate to providing an indication of highlights in a video content item. In general, the highlights may correspond to portions of the video content item. For example, the video content item may be a video such as a sports game, a video game (e.g., an eSports game), or another such event. The video content item may be of a particular duration and the highlights may be at various locations throughout the duration of the video content item.

The video content item may be of a relatively long duration where most of the duration of the video content item outside of the highlights is of relatively little interest to a viewer. For example, in a sports game, the portions of the duration of the video content item that do not involve scoring or other such events may not be of interest to the viewer while the portions that do involve scoring (i.e., the highlights) may be of interest to the viewer.

A viewer may adjust a playback speed of the video content item to access the portions of the duration of the video content item that may be of more interest. For example, the viewer may increase the playback speed while viewing the portions of the video content item that are of little interest to the viewer and may reduce the playback speed to a regular playback speed when viewing a highlight during another portion of the video content item. However, the user may miss particular highlights of the video content item while viewing portions of the video content item at a higher playback speed.

Aspects of the present disclosure may address the above and other deficiencies by identifying highlights in the video content item based on one or more types of indicators of a highlight occurring within the video content item and may provide an identification of the locations of the highlights in the video content item. For example, a highlight and duration (e.g., a start time and end time) of the highlight in the video content item may be identified based on indicators corresponding to video indicators, audio indicators, and/or user interaction indicators of the video content item.

A video indicator may be used to identify that a highlight may have occurred in the video content item based on a change in a portion of the video content item (e.g., a change in the portion between successive frames). In a sports game, a change in information overlaid (i.e., an information overlay) associated with the event may indicate a potential highlight. For example, a change in the scoreboard may indicate that a highlight has occurred in the video content item. As such, a change in a portion (i.e., a key area) of a video content item may indicate that a highlight has occurred. Furthermore, an audio indicator may also be used to identify the potential highlight in the video content item based on audio of the video content item. Referring to the sports game, an increase in volume or sound from the background (e.g., an audience of an event) may indicate that a highlight has occurred in the video content item. As another example, a particular sound effect or a voice pattern of a commentator (e.g., a more rapid speaking) may also indicate that the highlight has occurred.

The user interaction indicator may also be used to identify a highlight in a video content item based on how users interact with the video content item. For example, the video content item may be a live streaming event where users may provide or post comments via a graphical user interface concerning the live streaming event as the event progresses. The rate at which the comments are received may indicate that a highlight has occurred or the content of comments from viewers that are posted may indicate that the highlight has occurred at a particular time in the video content item. For example, if a high rate of comments are provided and the content of the comments are shorter in length or words, then a highlight may have occurred in the video content item.

As such, highlights of a video content item may be identified based on one of or a combination of a video indicator, audio indicator, and a user interaction indicator. In some embodiments, a user may add, modify, or enter other such input (e.g., a vote) to identify a highlight in the video content item. After the highlights have been identified, the location of the highlights in the video content item may be provided to a viewer who requests to access or view the video content item at a later time. For example, a graphical user interface may provide the video content item to the user and visual indicators may be provided with the graphical user interface, or overlaid on the video content item itself, to provide indications of the locations of the highlights in the video content item.

FIG. 1 illustrates an example system architecture 100, in accordance with one implementation of the disclosure. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, network connected televisions, netbook computers etc. In some implementations, client device 110A through 110Z may also be referred to as "user devices." Each client device includes a media viewer 111. In one implementation, the media viewers 111 may be applications that allow users to view content, such as images, videos (e.g., video content items with one or more identified highlights), web pages, documents, etc. For example, the media viewer 111 may be a web browser that can access, retrieve, present, and/or navigate content (e.g., web pages such as Hyper Text Markup Language (HTML) pages, digital media items or content items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that communicate with the server 130.

In general, functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to media items (also referred to as content items) and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a video content item.

A media item 121 may be consumed via the Internet and/or via a mobile device application. For brevity and simplicity, an online video (also hereinafter referred to as a video content item) is used as an example of a media item 121 throughout this document. As used herein, "media," "media item," "online media item," "digital media," "digital media item," "content," "content item," and "video content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). The server 130 may be included in the content sharing platform 120 or be part of a different system. The server 130 may host a highlights manager 200 that identifies highlights in a video content item. Further details with regard to the highlights manager 200 are disclosed in conjunction with FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, a user's purchase transaction history, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
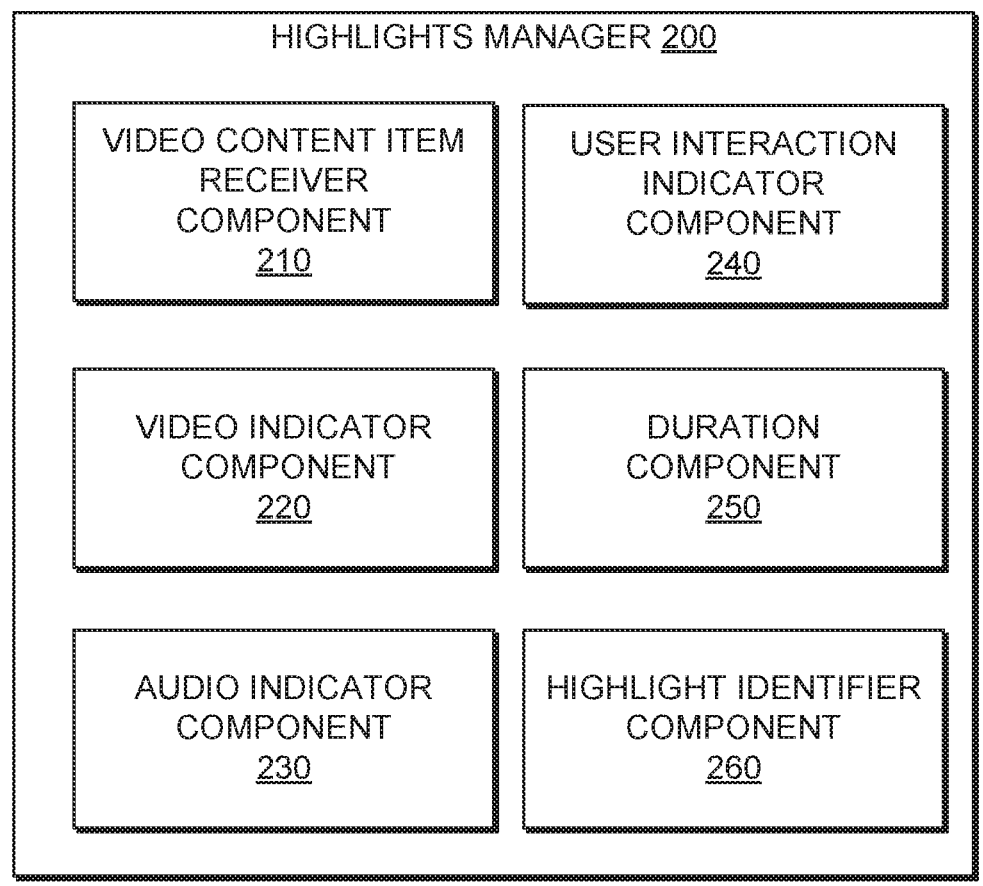
FIG. 2 illustrates an example highlights manager in accordance with some embodiments of the disclosure.

FIG. 2 illustrates an example highlights manager 200. In general, the highlights manager 200 may correspond to the highlights manager 200 of a server system 130 as shown in FIG. 1. The highlights manager 200 may include a video content item receiver component 210, a video indicator component 220, an audio indicator component 230, a user interaction indicator component 240, a duration component 250, and a highlight time indicator component 260. In alternative embodiments, the functionality of one or more of the components may be combined or divided.

As shown in FIG. 2, the highlights manager 200 may include a video content item receiver component 210 that may receive or identify a video content item. In some embodiments, the video content item may be a recording of an event (e.g., a sports game or a playing of a video game) or the video content item may be a live streaming of the event. For example, the video content item may be streamed or provided to multiple viewers over a network where the viewers are each simultaneously watching the video or viewing the video at approximately the same time. The highlights manager 200 may further include a video indicator component 220 that identifies highlights of the video content item based on one or more factors associated with a change between frames or a portion of the video of the video content item over time and the audio indicator component 230 may identify highlights of the video content item based on one or more factors associated with the audio of the video content item. Furthermore, the user interaction indicator component 240 may identify highlights of the video content item based on one or more factors associated with user interaction or a community of users associated with the video content item. In some embodiments, the highlights of the video content item may be identified based on one or more of the indicators from the visual indicator component 220, audio indicator component 220, and the user interaction component 240.

Referring to FIG. 2, the highlights manager 200 may further include a duration component 250 that may identify a time period of the video content item that corresponds to an identified highlight. For example, a start time and an end time (e.g., the duration) for each identified highlight may be identified based on a type of the video content item, a type of highlight that has been identified, and/or based on one or more of the visual, audio, and user interaction indicators. Further details with regard to identifying a time period or duration for a highlight are described in conjunction with FIG. 5.

The highlights manager 200 may further include a highlight identifier component 260 that may identify the times or time period of the highlights within the video content item and may provide an indication of the locations of the highlights within the video content item. For example, portions of a seek bar that is used to provide the video content item may indicate the presence of the highlights, a graphical message may indicate the presence of a next highlight, or other such graphical indication may identify one or more highlights within a video content item. Further details with regard to such indicators are described in conjunction with FIGS. 6A-6B.

Figure 3:
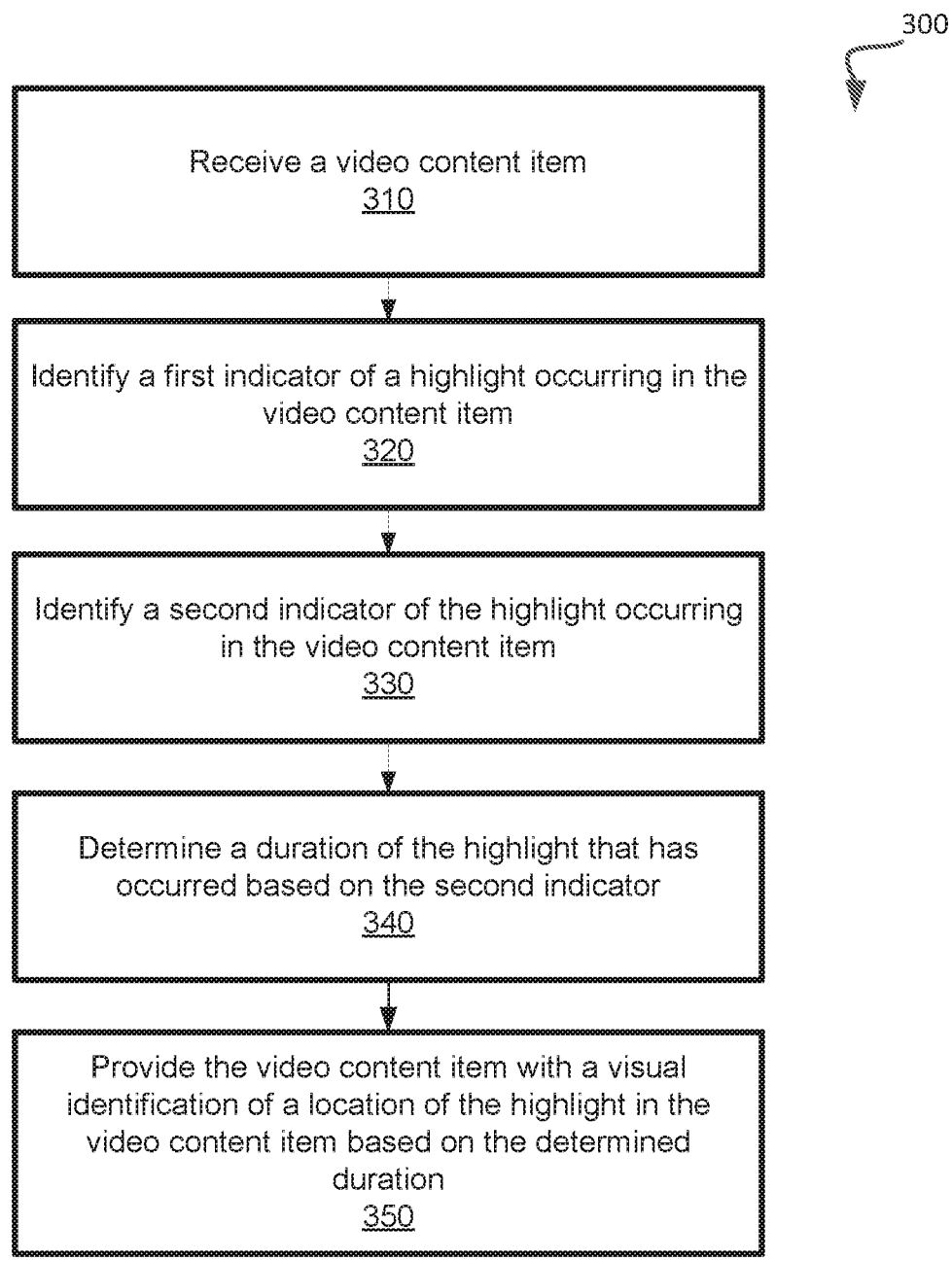
FIG. 3 is a flow diagram of an example method to provide an indication of highlights in a video content item in accordance with some embodiments.

FIG. 3 is a flow diagram of an example method to provide an indication of highlights in a video content item. In general, the method 300 may be performed by processing logic that may comprise hardware (e.g., processing device, circuitry, dedicated logic, programmable logic, microcode, etc.), software (e.g., instructions run on a processing device), or a combination thereof. In some embodiments, the method 300 may be performed by the highlights manager 200 of FIG. 1 or 2.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

As shown in FIG. 3, the method 300 may begin with the processing logic receiving a video content item (block 310). For example, a video content item that is being streamed to multiple users or viewed by multiple users may be identified. The processing logic may further identify a first indicator of a highlight occurring in the video content item (block 320). For example, a first visual indicator of a highlight may be received. The visual indicator may identify whether a key area, or a portion, of the video content item has changed at a time or between frames of the video content item. In some embodiments, the visual indicator may identify whether a first key area or first portion of the video content item has changed (e.g., a status of a character played in a video game) and whether a second key area or second portion of the video content item (e.g., an overall score) has changed. As such, a change in a portion of the visual content of the video content item may indicate a highlight has occurred in the video content item. Further details with regard to a changing of a key area of the video content item are described in conjunction with FIGS. 4A-D.

Another type of indicator associated with a highlight may be an audio indicator that may be used to identify a highlight based on an audio signal or noise level of the audio of the video content item. For example, a particular word or sound being in the audio of the video content item may indicate that a highlight has occurred. A commentator included in the audio of the video content item speaking more rapidly (e.g., an increased rate of speech) or in a particular pitch may indicate that a highlight has occurred during the event corresponding to the video content item. The indicator may also correspond to a user interaction indicator that is based on users who have viewed or are viewing the video content item. For example, the video content item may be provided via a graphical user interface to multiple viewers (i.e., a live stream) who may provide comments or feedback as the video content item is played or provided to the viewers. An increase in the rate of comments that are received with regard to the video content item may indicate that a highlight has occurred in the video content item. For example, when the rate of comments that are received exceeds a threshold rate of comments, then a highlight may have occurred in the video content item. In some embodiments, the content of the comments or feedback provided by viewers may indicate the presence of a highlight of the video content item. For example, an increase in the rate of comments that are shorter in length than an average comment length for the video content item when comments are received at a reduced rate may indicate that a highlight has occurred. An increase in comments or feedback that are shorter in content (e.g., fewer words or characters) from viewers may indicate the highlight as more viewers are expressing a quick comment in reaction to a more interesting event that has occurred during the video content item. Furthermore, a number of viewers that are viewing or exiting or stopping to view the video content item during a live stream of the video content item may indicate whether a highlight has occurred in the video content item. For example, an increase in a number of users who were viewing the video content item and have now stopped viewing (e.g., left the live stream) the video content item during the live stream at a particular time may indicate that a highlight has ended at the time when viewers leave the live stream of the video content item. In some embodiments, user playback behavior when viewing the video content item may further indicate times when a highlight has occurred during the video content item. For example, portions of the video content item that are played back or viewed one or more additional times by a viewer may be identified as being associated with a highlight.

Referring to FIG. 3, the processing logic may identify a second indicator of the highlight occurring in the video content item (block 330). For example, the second indicator may occur in the video content item before the first indicator occurs in the video content item or after the first indicator occurs in the video content item. The second indicator may correspond to a change in a second key portion of the video content item. In some embodiments, the second indicator may be another type of indicator as described herein.

The processing logic may determine a duration of the highlight that has occurred within the video content item based on the second indicator (block 330). For example, the video content item may be a particular duration (e.g., three hours) and a highlight that has been identified as occurring based on the first indicator may be associated with a start time that is based on the second indicator that occurs before the first indicator. In some embodiments, a third indicator may also be identified to identify the end time of the highlight. The start time and the end time may be identified by other indicators that have occurred around the time of the indicator when the highlight has been identified. As such, a first highlight may be identified as having a first start time and a first end time within the duration of the video content item and a second highlight may be identified as having a second start time that is after the first end time and a second end time that is after the second start time. The determination of the start time and an end time for a highlight are described in further detail with regard to FIG. 5.

The processing logic may further provide the video content item with an indication of the highlights based on the determined durations (block 340). For example, a seek bar that is provided with a presentation of the video content item may indicate the time periods within the duration of the video content item that correspond to identified highlights or a message may be included to advance the video content item to a next highlight within the video content item. Further details with regard to providing the video content item with identified highlights are described in conjunction with FIGS. 6A-6B.

Figure 4A:
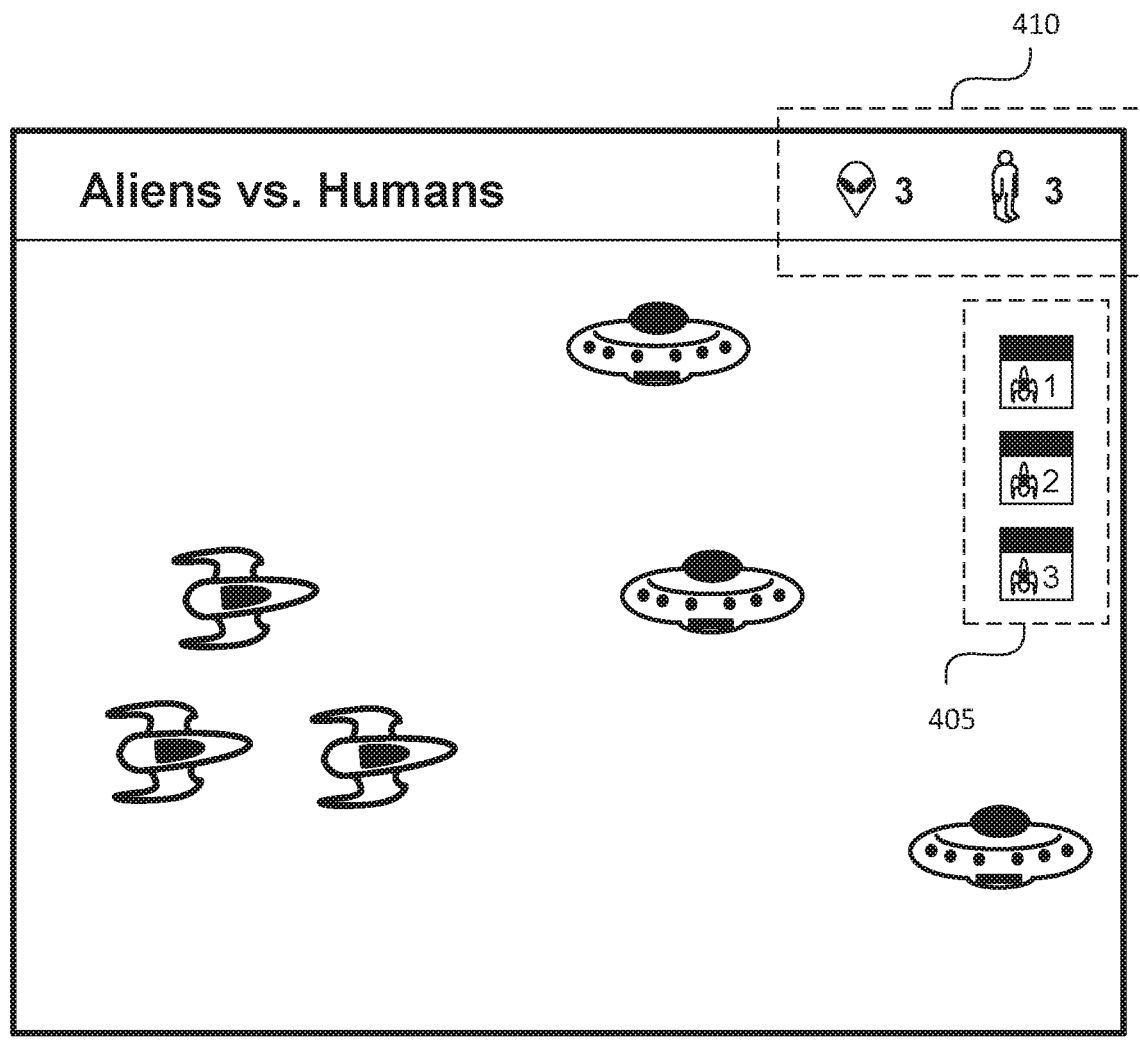
FIG. 4A illustrates an example graphical user interface providing a video content item in accordance with some embodiments of the present disclosure.

FIG. 4A illustrates an example graphical user interface providing a video content item. In general, highlights of the video content item that is provided or displayed by graphical user interface may be identified by the highlights manager 200 of FIG. 1 or 2.

As shown in FIG. 4A, the video content item may be presented to be viewed by a viewer in response to a request to view the video content item. The video content item may include a first information overlay 405 (i.e., a first portion or a first key area) and a second information overlay 410 (i.e., a second portion or a second key area). The first and second information overlays may represent a status associated with an event depicted in the video content item. For example, for a video game, the first information overlay 405 may represent a health status for individual players or characters in the video game and the second information overlay 410 may represent a game status (e.g., an overall score).

Figure 4B:
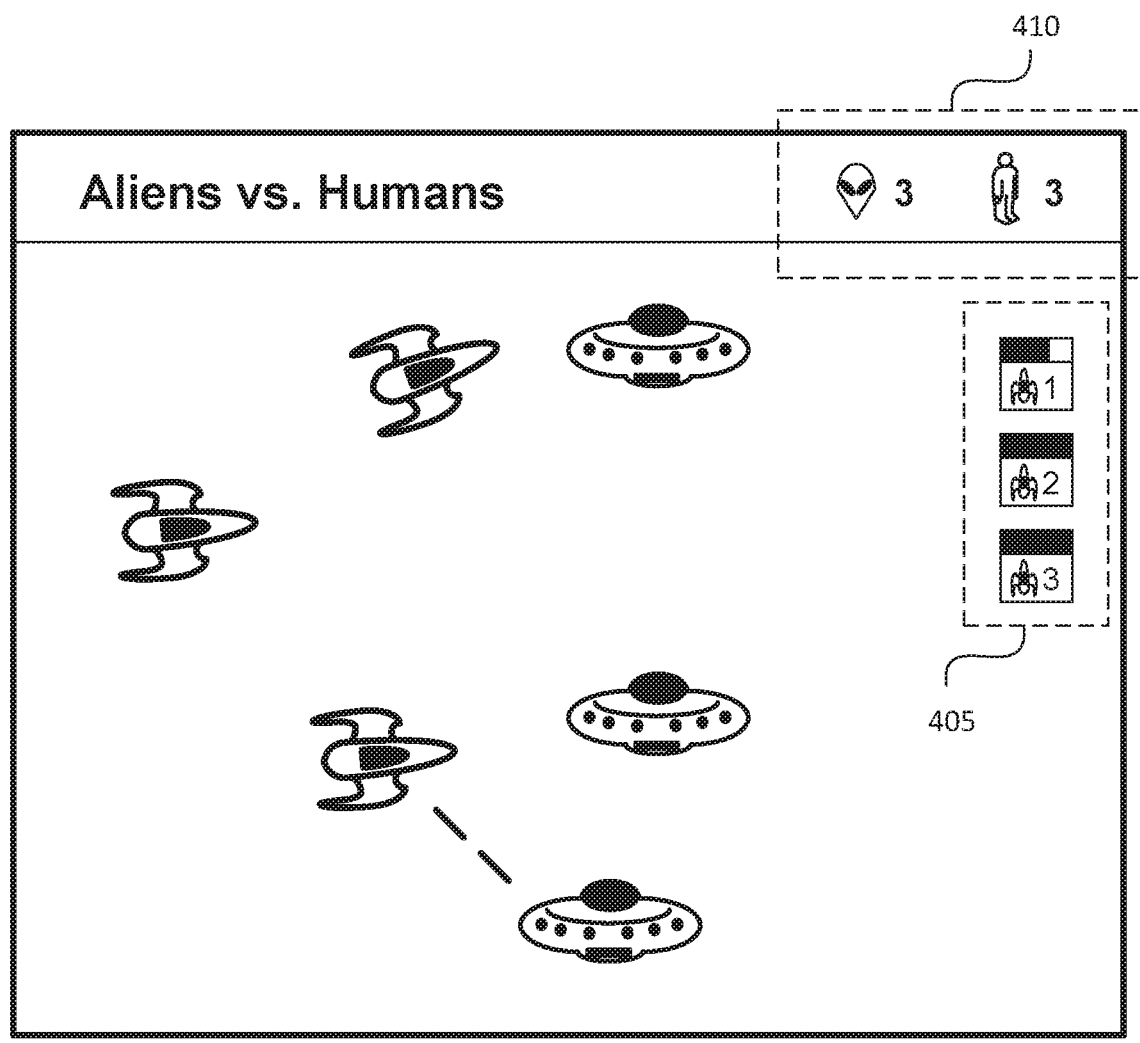
FIG. 4B illustrates an example graphical user interface providing a video content item with a changing of a first key area of the video content item in accordance with some embodiments of the present disclosure.

FIG. 4B illustrates the video content item with a changing of a first key area of the video content item. In general, the video content item of FIG. 4B may correspond to the video content item of FIG. 4A at a subsequent time.

As shown in FIG. 4B, the first information overlay 405 (i.e., the first key area or first portion of the video of the video content item) may be changed relative to the video content item at a prior time as illustrated in FIG. 4A while the second information overlay 410 is not changed. For example, a health status of one of the characters of the video game may be changed or reduced as a result of an event that has occurred during the video game. In some embodiments, the changing of the first information overlay 405 may correspond to a visual indicator of a highlight. For example, a highlight for the video content item may be associated with a start time based on the first information overlay 405 changing.

Figure 4C:
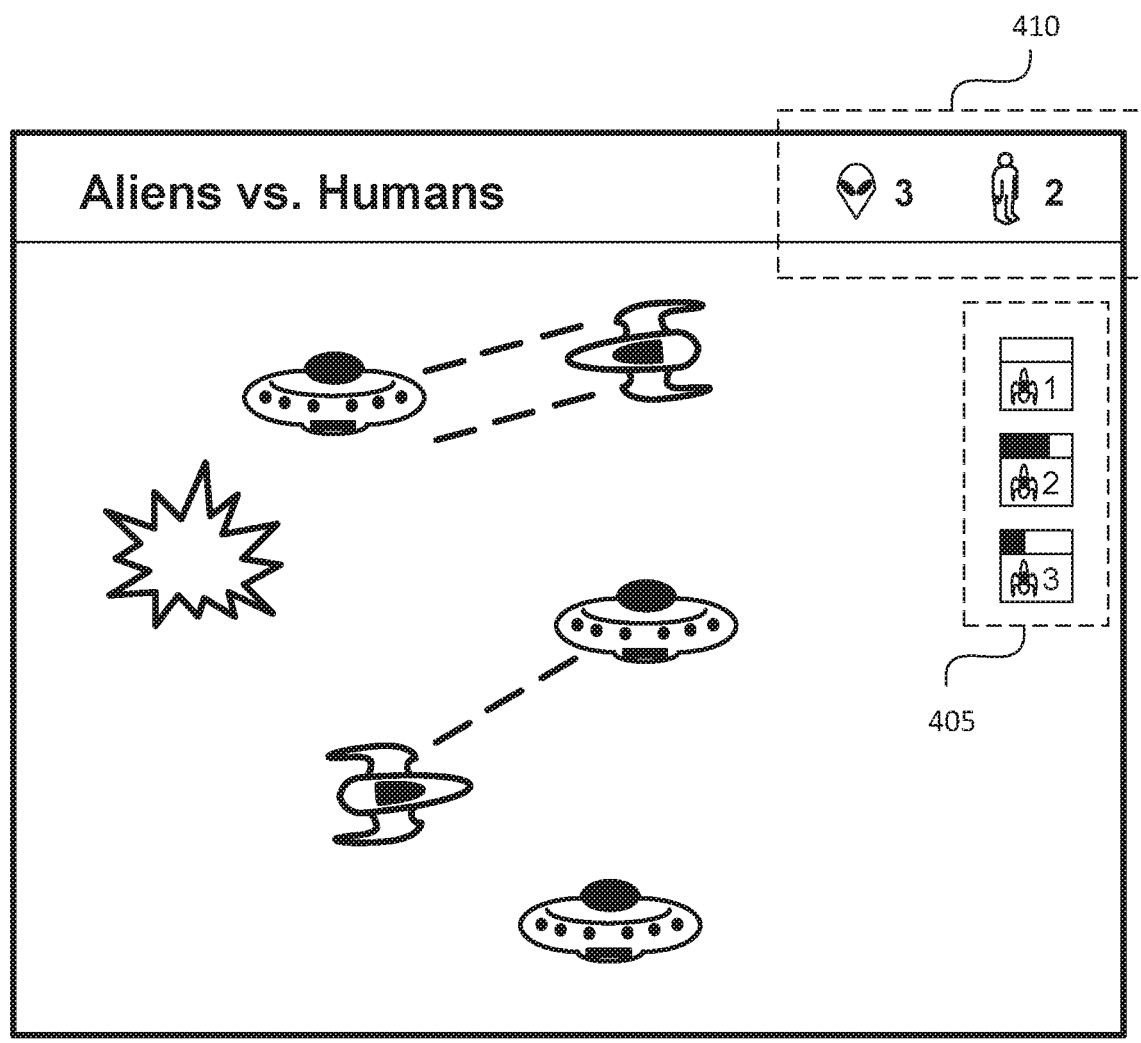
FIG. 4C illustrates an example graphical user interface providing a video content item with a changing of a second key area of the video content item in accordance with some embodiments of the present disclosure.

FIG. 4C illustrates an example graphical user interface providing the video content item with a changing of a second key area of the video content item. In general, the video content item of FIG. 4C may correspond to the video content item of FIG. 4B at a subsequent time.

As shown in FIG. 4C, the second information overlay 410 of the video content item may be changed while the first information overlay 405 has also changed. The changing of the second information overlay 410 may further indicate a highlight within the video content item. For example, the change of numbers of a scoreboard may indicate the presence of a highlight in the video content item or that a highlight has occurred at the time that the second information overlay 410 changed.

Figure 4D:
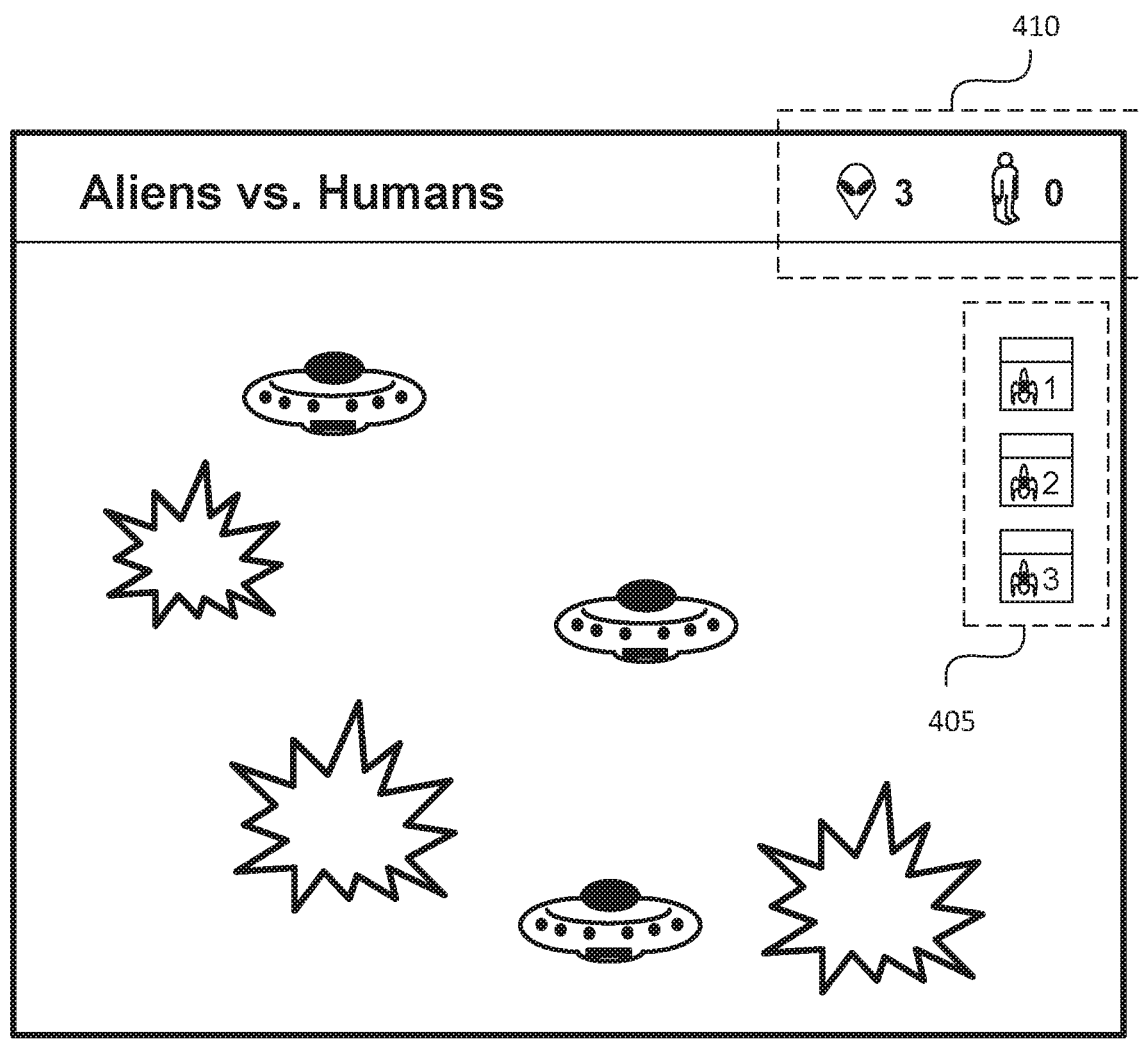
FIG. 4D illustrates an example graphical user interface providing a video content item with another change of the second key area of the video content item in accordance with some embodiments of the present disclosure.

Furthermore, FIG. 4D may illustrate the video content item of FIG. 4C at another subsequent time where the first information overlay 405 and the second information overlay 410 have each changed. For example, the first information overlay 405 may indicate that each character in the video game is no longer playing in the video game and the second information overlay 410 may indicate a final score for an event that has occurred during the video game. The change in the first information overlay 405 or the second information overly 410 may indicate an end time of the highlight that was identified as having occurred in response to the first change in the second information overlay 405.

In some embodiments, the changing of different portions of the video of the video content item or different information overlays of the video content item may be used to identify a highlight and a duration of the highlight. For example, the first change of the second information overlay 410 as described in conjunction with FIG. 4C may be used to identify that a highlight has occurred in the video content item. The start time for the identified highlight may be based on a change in the first information overlay 405 that occurs as described in conjunction with FIG. 4B before the first change to the second information overlay 410. Furthermore, a second change in the second information overlay 410 and/or the first information overlay 405 as described in conjunction with FIG. 4D that occurs after the first change to the second information overlay 410 may indicate an end time for the highlight that was identified as having occurred in the video content item.

Figure 5:
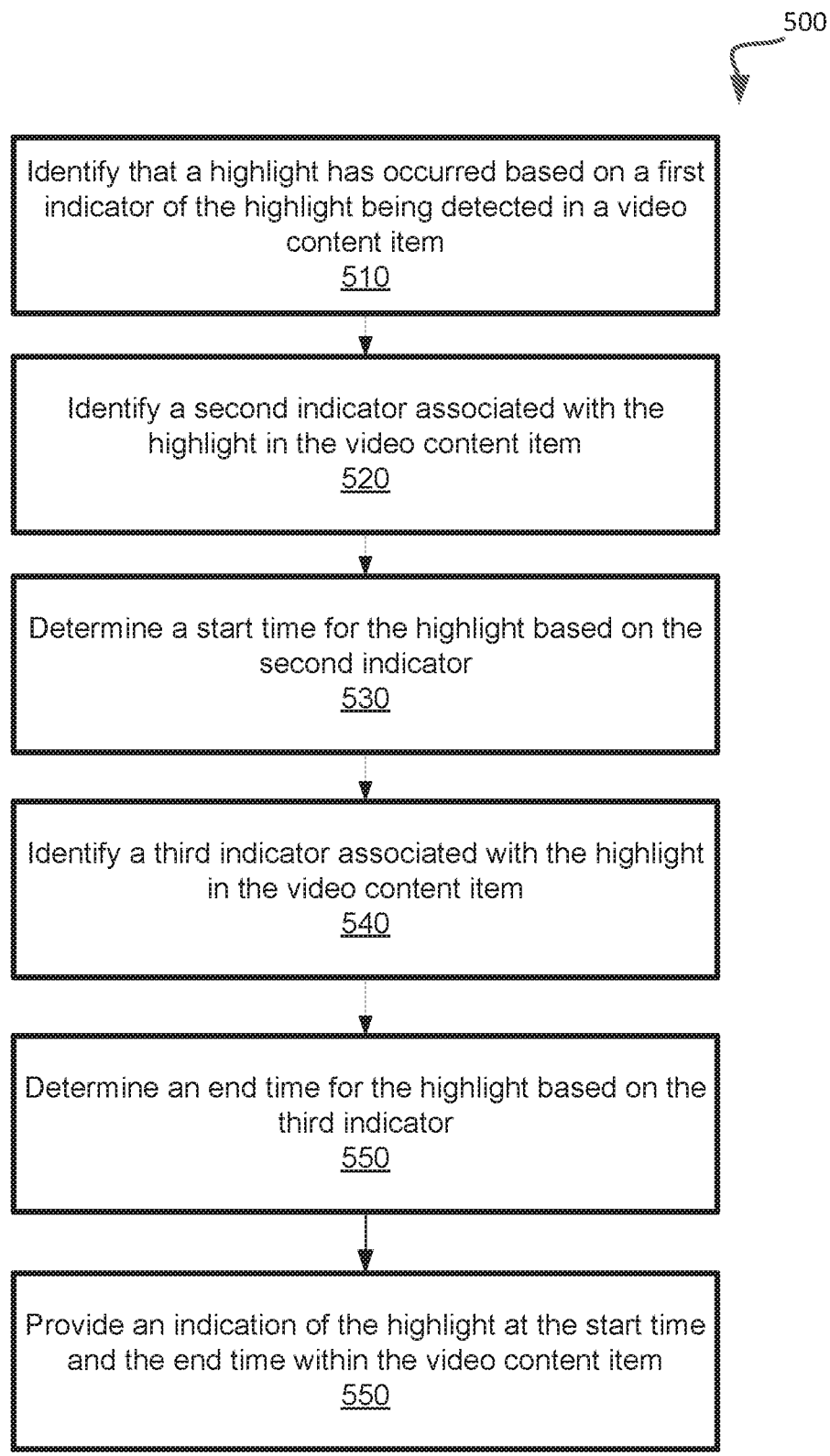
FIG. 5 is a flow diagram of an example method to present a video content item with indications of locations of highlights based on a determined duration in accordance with some embodiments.

FIG. 5 is a flow diagram of an example method 500 to provide a video content item with indications of locations of highlights within the video content item. In general, the method 500 may be performed by processing logic that may comprise hardware (e.g., processing device, circuitry, dedicated logic, programmable logic, microcode, etc.), software (e.g., instructions run on a processing device), or a combination thereof. In some embodiments, the method 500 may be performed by the highlights manager 200 of FIG. 1 or 2.

As shown in FIG. 5, the method 500 may begin with processing logic identifying that a highlight has occurred based on a first indicator associated with the highlight in a video content item (block 510). For example, a change in a first key area of the video content item or an identification of a particular audio pattern may be identified. The processing logic may further identify a second indicator associated with the highlight in the video content item (block 520). For example, after positively identifying that a highlight has occurred based on the first indicator, the second indicator may be identified before an occurrence of the first indicator during the video content item. The processing logic may subsequently determine a start time for the highlight based on the second indicator (block 530). For example, a second indicator associated with the highlight may be identified at an earlier time during the duration of the video content item than the first indicator. The second indicator may correspond to another change in a second key area of the video content item or an identification of another audio pattern. For example, the start time for the highlight may be the time during the video content item that the second indicator occurs. The processing logic may further identify a third indicator that is associated with the highlight in the video content item (block 540). For example, the third indicator may be identified at a later time during the duration of the video content item than the first indicator. Subsequently, the processing logic may determine an end time for the highlight based on the third indicator (block 550). For example, the end time for the highlight may be the time during the video content item that the third indicator occurs. Subsequently, the processing logic may provide an indication of the highlight in the video content item at the start time and the end time within the video content item (block 550).

As an example, the presence of a highlight in a video content item may be identified as having occurred when a change in a first key area corresponding to a score of a game has been identified. The start time of the highlight may be identified based on another highlight indicator. For example, a change in a second key area that corresponds to a status associated with the game (e.g., a health status of players in a video game, or the presence of players at a particular portion of a sports game) may be a second indicator that is associated with the start time of the highlight. The change in the second key area may precede the change in the first key area. The time that the second key area changed may be the start time for the highlight that was identified based on the change to the first key area. The end of the highlight may be based on another change in the first key area or another change in the second key area. The time that the other change occurs may be the end time for the highlight.

Figure 6A:
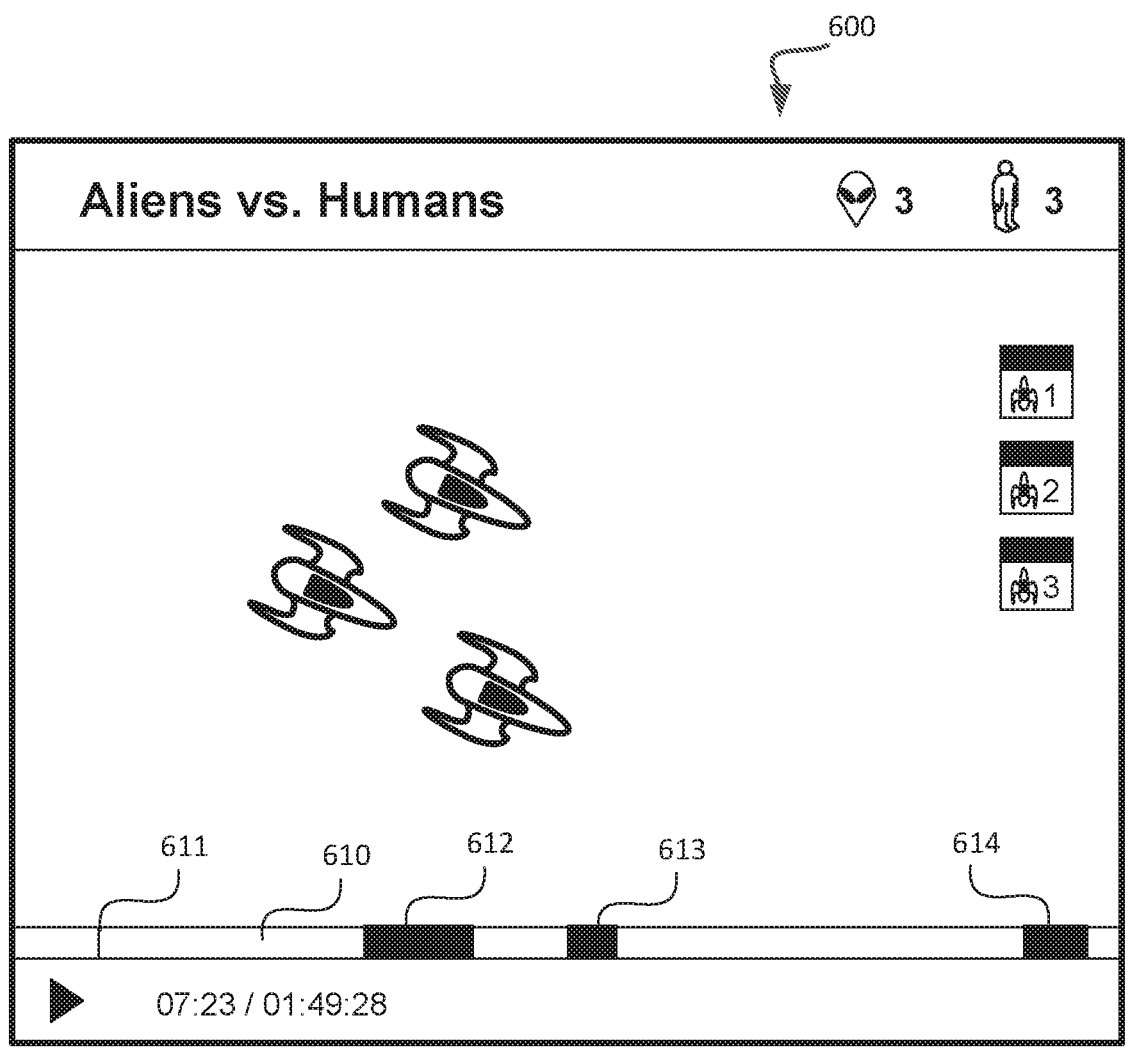
FIG. 6A illustrates an example graphical user interface providing a video content item with indications of locations of highlights of the video content item on a seek bar in accordance with some embodiments of the present disclosure.

FIG. 6A illustrates an example graphical user interface 600 providing a video content item with indications of locations of highlights in the video content item on a seek bar. In general, the graphical user interface 600 may be provided by the highlights manager 200 of FIG. 1 or 2.

As shown in FIG. 6A, the graphical user interface 600 may include a seek bar 610 that identifies a current time 611 of the video content item that is being played or provided to a viewer as well as indications of highlights 612, 613, and 614 within the video content item. A user or viewer of the graphical user interface 600 may move the current time 611 of the seek bar 610 to one of the highlights 612, 613, or 614 by selecting or clicking on the highlights 612, 613, and 614 that are identified on the seek bar. As such, the graphical user interface 600 may provide the video content item with multiple indicators of the start time and end time (e.g., the duration) of each of the highlights that have been identified as having occurred in the video content item.

Figure 6B:
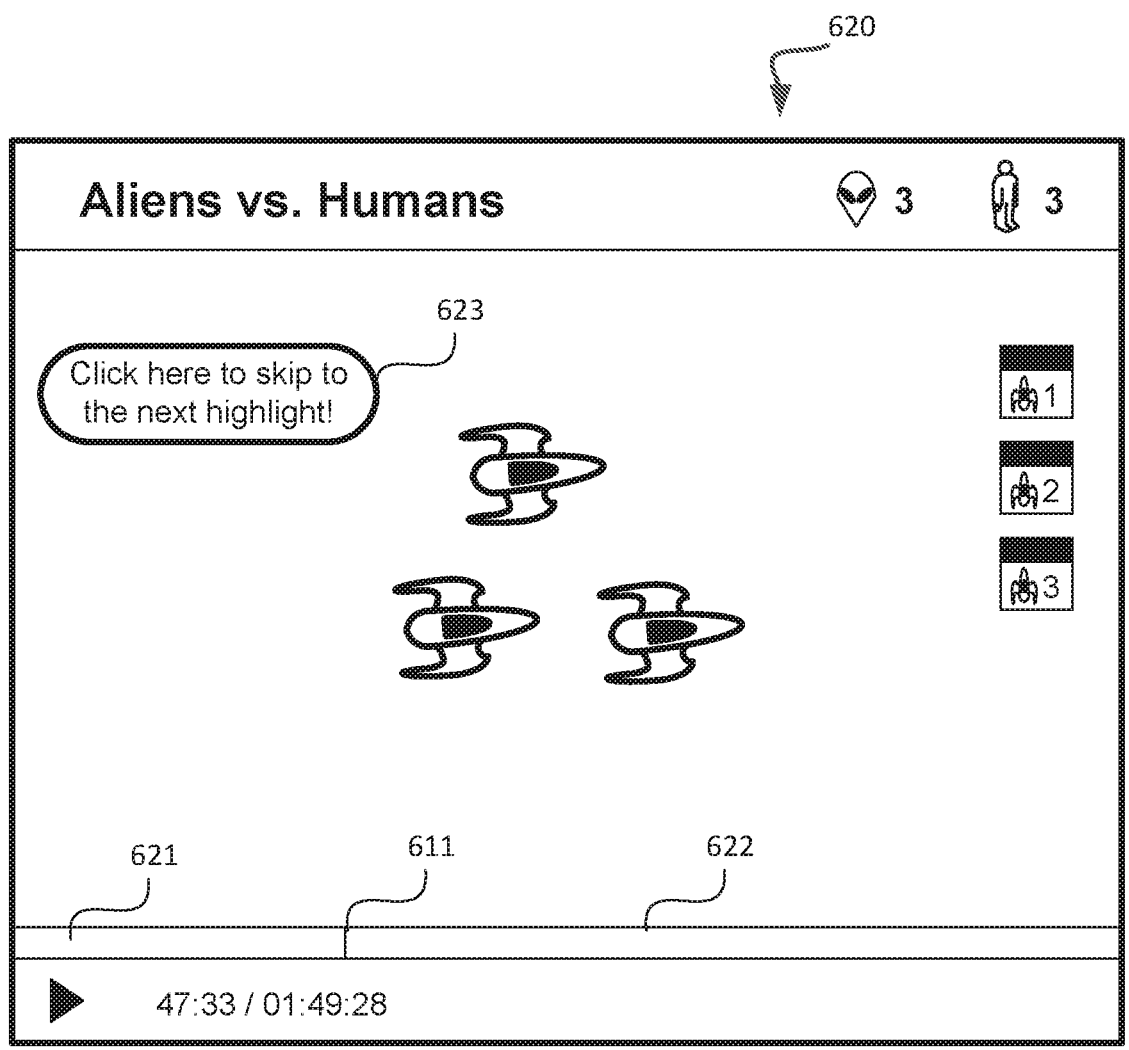
FIG. 6B illustrates an example graphical user interface providing a video content item with an indication of an approaching highlight of the video content item in accordance with some embodiments.

FIG. 6B illustrates an example graphical user interface 620 providing a video content item with an indication of an approaching highlight of the video content item. In general, the graphical user interface 620 may be provided by the highlights manager 200 of FIG. 1 or 2.

As shown in FIG. 6B, the graphical user interface 620 may provide the video content item where the seek bar 621 indicates a current time 611 of the video content item that is being provided to a viewer. The graphical user interface 620 may further include a message 623 that may be superimposed on a portion of the video content item or may be located within the graphical user interface 620 adjacent to the video content item. The message 623 may be selected to skip the providing of the video content item from the current time 611 to a next highlight 622 in the video content item. In some embodiments, a location of the next highlight 622 may be indicated on the seek bar 621. As such, a viewer of the video content item may view a portion of the video content item that is not identified as a highlight and may fast forward or jump to the next highlight in the video content item by selecting or clicking on the message 623.

In some embodiments, a viewer or user may enter a directed mode when viewing the video content item where the playback speed of the video content item is adjusted based on the identified highlights. For example, portions of the video content item that do not correspond to a highlight may be played back at an increased speed and portions of the video content item that correspond to a highlight may be played back to the viewer at a regular speed (e.g., lower than the increased speed of the portions that do not correspond to highlights).

Figure 7:
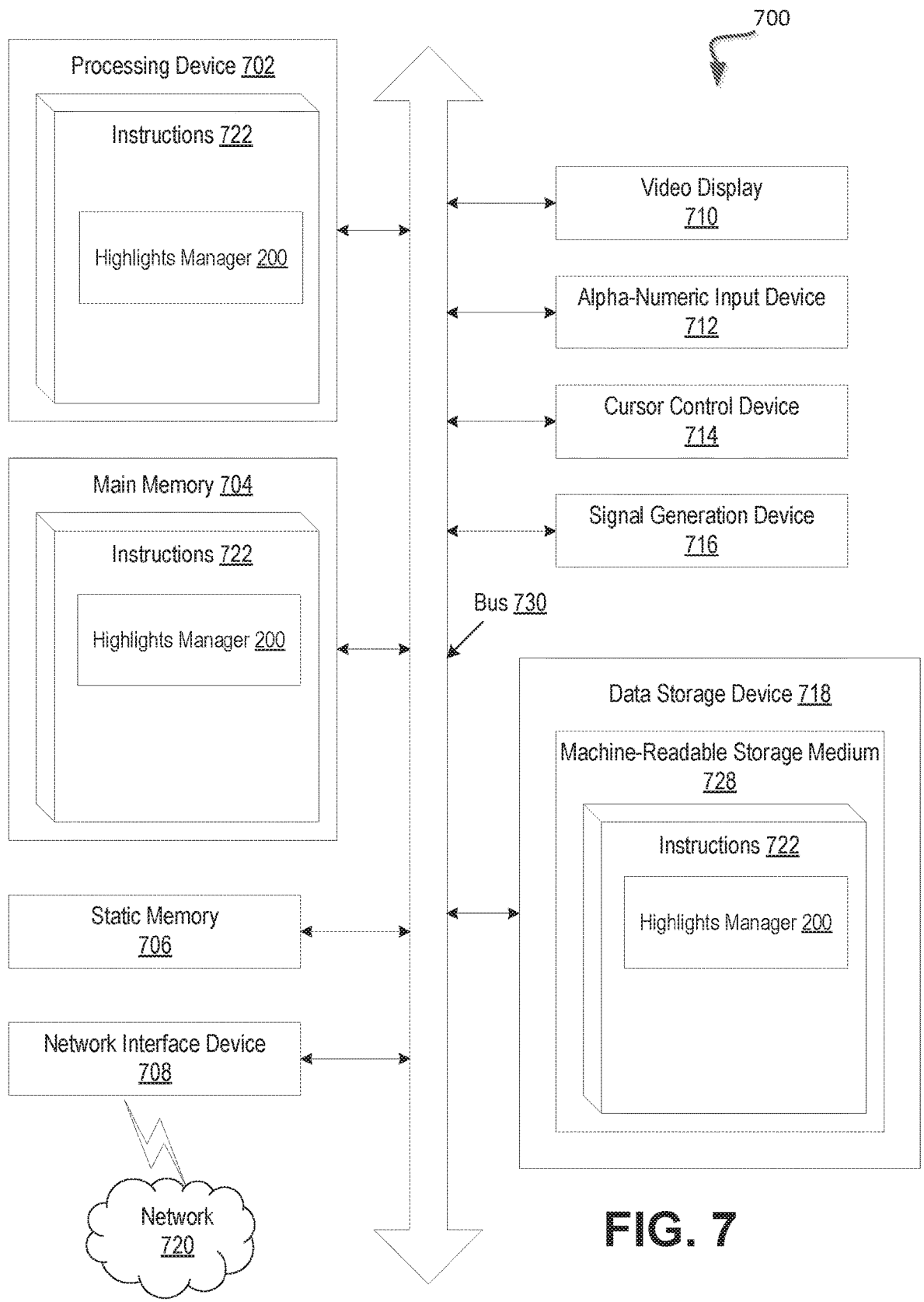
FIG. 7 illustrates a block diagram of an embodiment of a computer system in which some embodiments of the disclosure may operate.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or DRAM, etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 722 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium 728 (also known as a computer-readable medium) on which is stored one or more sets of instructions or software 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting machine-readable storage media.

In one implementation, the instructions 722 include instructions for a highlights manager (e.g., highlights manager 200 of FIG. 1 or 2) and/or a software library containing methods that functionality in a highlights manager. While the machine-readable storage medium 728 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   identifying a video content item associated with a live stream;
   identifying a first indicator of a highlight occurring in the video content item based on a number of users using the live stream to view the video content item and a length of content of user comments from the number of users using the live stream during the occurrence of the highlight in the video content item being smaller than a length of content of other user comments received during a time in the video content item that does not include the highlight;
   in response to identifying the first indicator of the highlight occurring in the video content item, identifying a second indicator associated with the highlight based on another number of users leaving the live stream;
   determining a duration of the highlight that has occurred in the video content item based on the first indicator and the second indicator;
   providing, by a processing device, the video content item;
   providing a message during a playback of the video content item to indicate that the highlight that has occurred in the video content item is a next highlight in the video content item;
   receiving a selection of the message provided during the playback of the video content item; and
   in response to receiving the selection of the message, changing the playback of the video content item to the highlight in the video content item based on the determined duration.

2. The method of claim 1, wherein the first indicator corresponds to a change in a first key portion of the video content item and the second indicator corresponds to another change in a second key portion of the video content item, wherein the identifying of the first indicator of the highlight occurring in the video content item comprises determining that the first key portion of the video content item has changed, and wherein the identifying of the second indicator associated with the highlight to determine the duration of the highlight in the video content item comprises determining a time that the second key portion of the video content item changed after the first key portion changed to identify an end time of the highlight.

3. The method of claim 1, wherein the determining of the duration of the highlight comprises:
   identifying an end time for the highlight based on a time when the another number of users leave the live stream.

4. The method of claim 1, wherein the first indicator of the highlight corresponds to a change in a portion of video of the video content item or a change in audio of the video content item and the second indicator corresponds to a change in the other of the portion of the video or the change in the audio of the video content item.

5. The method of claim 1, and wherein the first indicator of the highlight is identified when a rate of the user comments exceeds a threshold rate.

6. The method of claim 1, wherein the providing of the video content item with an identification of the location of the highlight in the video content item comprises:
   providing the identification of the location of the highlight in the video content item on a seek bar of the video content item, wherein the identification of the location of the highlight identifies a start time and end time of the highlight within the video content item.

7. The method of claim 1, wherein the message is superimposed over a portion of the video content item, and wherein the changing of the playback of the video content item to the highlight corresponds to a skipping of the video content item to a start of the highlight.

8. A non-transitory machine-readable storage medium storing instructions which, when executed, cause a processing device to perform operations comprising:
   identifying a video content item associated with a live stream;
   identifying a first indicator of a highlight occurring in the video content item based on a number of users using the live stream to view the video content item and a length of content of user comments from the number of users using the live stream during the occurrence of the highlight in the video content item being smaller than a length of content of other user comments received during a time in the video content item that does not include the highlight;
   in response to identifying the first indicator of the highlight occurring in the video content item, identifying a second indicator associated with the highlight based on another number of users leaving the live stream;
   determining a duration of the highlight that has occurred in the video content item based on the first indicator and the second indicator;
   providing the video content item;
   providing a message during a playback of the video content item to indicate that the highlight that has occurred in the video content item is a next highlight in the video content item;
   receiving a selection of the message provided during the playback of the video content item; and in response to receiving the selection of the message, changing the playback of the video content item to the highlight in the video content item based on the determined duration.

9. The non-transitory machine-readable storage medium of claim 8, wherein the first indicator corresponds to a change in a first key portion of the video content item and the second indicator corresponds to another change in a second key portion of the video content item,
wherein to identify the first indicator of the highlight occurring in the video content item, the operations further comprise determining that the first key portion of the video content item has changed, and
wherein to identify the second indicator associated with the highlight to determine the duration of the highlight in the video content item, the operations further comprise determining a time that the second key portion of the video content item changed after the first key portion changed to identify an end time of the highlight.

10. The non-transitory machine-readable storage medium of claim 9, wherein the first key portion is a first information overlay associated with the video content item and the second key portion is a second information overlay associated with the video content item.

11. The non-transitory machine-readable storage medium of claim 8, wherein the first indicator of the highlight corresponds to a change in a portion of video of the video content item or a change in audio of the video content item and the second indicator corresponds to a change in the other of the portion of the video or the change in the audio of the video content item.

12. The non-transitory machine-readable storage medium of claim 8, and wherein the first indicator of the highlight is identified when a rate of the user comments exceeds a threshold rate.

13. The non-transitory machine-readable storage medium of claim 8, wherein to provide the video content item with an identification of the location of the highlight in the video content item, the operations further comprise:
providing the identification of the location of the highlight in the video content item on a seek bar of the video content item, wherein the identification of the location of the highlight identifies a start time and end time of the highlight within the video content item.

14. A system comprising:
a memory; and
a processing device, operatively coupled with the memory, to:
receive a video content item associated with a live stream;
identify a first indicator of a highlight occurring in the video content item based on a number of users using the live stream to view the video content item and when a first information overlay of the video content item changes and a length of content of user comments from the number of users using the live stream during the occurrence of the highlight in the video content item being smaller than a length of content of other user comments received during a time in the video content item that does not include the highlight;
in response to identifying the first indicator of the highlight occurring in the video content item, identify a second indicator associated with the highlight based on the first indicator and when a second information overlay of the video content item changes;
determine a start time for the highlight based on the first indicator and an end time for the highlight based on the second indicator;
provide the video content item;
provide a message during a playback of the video content item to indicate that the highlight that has occurring in the video content item is a next highlight in the video content item;
receive a selection of the message provided during the playback of the video content item; and
in response to receiving the selection of the message, changing the playback of the video content item to the highlight in the video content item based on the determined start time and end time.

15. The system of claim 14, wherein the highlight is further identified as occurring based on a change in audio of the video content item when the first information overlay of the video content item changes.

16. The system of claim 14, wherein the determining of the end time for the highlight is further based on a time when the number of users have left the live stream.

17. The system of claim 14, wherein to provide an identification of the location of the highlight in the video content item, the processing device is further to provide a message with the video content item to indicate the highlight in the video content item, and wherein the processing device is further to:
receive a selection of the message; and
in response to the selection of the message, change a playback of the video content item to play the video content item at the start time of the highlight.

18. The system of claim 14, wherein to provide the video content item with an identification of the location of the highlight in the video content item, the processing device is further to:
provide the identification of the location of the highlight in the video content item on a seek bar of the video content item, wherein the identification of the location of the highlight identifies the start time and the end time of the highlight within the video content item on the seek bar.

* * * * *